(12) United States Patent
Ahn et al.

(10) Patent No.: US 10,372,225 B2
(45) Date of Patent: Aug. 6, 2019

(54) VIDEO DISPLAY DEVICE RECOGNIZING A GESTURE OF A USER TO PERFORM A CONTROL OPERATION AND OPERATING METHOD THEREOF

(71) Applicant: LG ELECTRONICS INC., Seoul (KR)

(72) Inventors: Wooseok Ahn, Seoul (KR); Sangkyu Kang, Seoul (KR); Hyeongchul Oh, Seoul (KR); Sewon Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 7 days.

(21) Appl. No.: 15/320,181

(22) PCT Filed: Jul. 29, 2014

(86) PCT No.: PCT/KR2014/006956
§ 371 (c)(1),
(2) Date: Dec. 19, 2016

(87) PCT Pub. No.: WO2015/194697
PCT Pub. Date: Dec. 23, 2015

(65) Prior Publication Data
US 2017/0153710 A1    Jun. 1, 2017

(30) Foreign Application Priority Data

Jun. 20, 2014  (KR) ........................ 10-2014-0075922

(51) Int. Cl.
*G06F 3/01*    (2006.01)
*H04N 21/422*  (2011.01)
(Continued)

(52) U.S. Cl.
CPC ......... *G06F 3/017* (2013.01); *G06K 9/00342* (2013.01); *G06K 9/00355* (2013.01);
(Continued)

(58) Field of Classification Search
CPC .......... G06F 3/005; G06F 3/011; G06F 3/016; G06F 3/017; G06F 3/0304;
(Continued)

(56) References Cited

U.S. PATENT DOCUMENTS 6,176,782 B1 * 1/2001 Lyons ..................... A63F 13/06
434/367
9,436,290 B2 * 9/2016 Kang ................. G06K 9/00355
(Continued)

FOREIGN PATENT DOCUMENTS

WO    WO 2012/144667 A1    10/2012

*Primary Examiner* — Alexander Eisen
*Assistant Examiner* — Nelson Lam
(74) *Attorney, Agent, or Firm* — Birch, Stewart, Kolasch & Birch, LLP

(57) ABSTRACT

An operating method of a video display device, and which includes obtaining an image of a user of the video display device; generating a plurality of gesture areas for the user from the obtained image; recognizing a position of a gesture object of the user from the plurality of generated gesture areas; recognizing a gesture of the user from the obtained image; and performing a control operation corresponding to the position of the recognized gesture object and the recognized gesture.

15 Claims, 8 Drawing Sheets

(51) Int. Cl.
*H04N 21/4223* (2011.01)
*H04N 21/44* (2011.01)
*G06K 9/00* (2006.01)
*H04N 5/44* (2011.01)
*H04N 21/442* (2011.01)

(52) U.S. Cl.
CPC ....... *H04N 5/4403* (2013.01); *H04N 21/4223* (2013.01); *H04N 21/42206* (2013.01); *H04N 21/44008* (2013.01); *H04N 21/44218* (2013.01)

(58) Field of Classification Search
CPC ........... G06K 9/00342; G06K 9/00355; G06K 9/00362; H04N 5/4403; H04N 21/44218
USPC .......... 345/156–166, 173–179; 382/106–107
See application file for complete search history.

(56) References Cited

U.S. PATENT DOCUMENTS

| | | | | |
|---|---|---|---|---|
| 10,162,423 B2* | 12/2018 | Ahn | .................. | H04N 21/4227 |
| 2002/0075334 A1* | 6/2002 | Yfantis | .................. | G06F 3/017 |
| | | | | 715/863 |
| 2006/0168523 A1* | 7/2006 | Yoda | .................. | G06F 3/017 |
| | | | | 715/728 |
| 2009/0141982 A1* | 6/2009 | Suzuki | .................. | G06K 9/00335 |
| | | | | 382/190 |
| 2010/0079677 A1* | 4/2010 | Matsubara | .................. | G06F 3/017 |
| | | | | 348/699 |
| 2012/0131514 A1 | 5/2012 | Ansell et al. | | |
| 2013/0241830 A1* | 9/2013 | Ohta | .................. | G06F 3/017 |
| | | | | 345/158 |
| 2013/0265226 A1 | 10/2013 | Park et al. | | |
| 2013/0271370 A1* | 10/2013 | Wang | .................. | G06F 3/017 |
| | | | | 345/158 |
| 2013/0278503 A1* | 10/2013 | Hirata | .................. | G06F 3/017 |
| | | | | 345/158 |
| 2013/0307766 A1 | 11/2013 | Amathnadu et al. | | |
| 2014/0101578 A1* | 4/2014 | Kwak | .................. | G06F 3/017 |
| | | | | 715/761 |
| 2014/0132505 A1 | 5/2014 | Vennelakanti et al. | | |
| 2014/0172231 A1* | 6/2014 | Terada | .................. | G06F 3/005 |
| | | | | 701/36 |
| 2015/0015480 A1* | 1/2015 | Burr | .................. | G06F 3/0304 |
| | | | | 345/156 |
| 2015/0062004 A1* | 3/2015 | Rafii | .................. | G06F 3/017 |
| | | | | 345/156 |
| 2015/0160736 A1* | 6/2015 | Fujiwara | .................. | G06F 3/017 |
| | | | | 345/156 |
| 2015/0169076 A1* | 6/2015 | Cohen | .................. | G06F 3/04815 |
| | | | | 345/156 |
| 2015/0304712 A1* | 10/2015 | Liu | .................. | H04N 21/472 |
| | | | | 348/734 |
| 2017/0139482 A1* | 5/2017 | Ahn | .................. | H04N 21/4227 |

* cited by examiner

[Fig. 1]
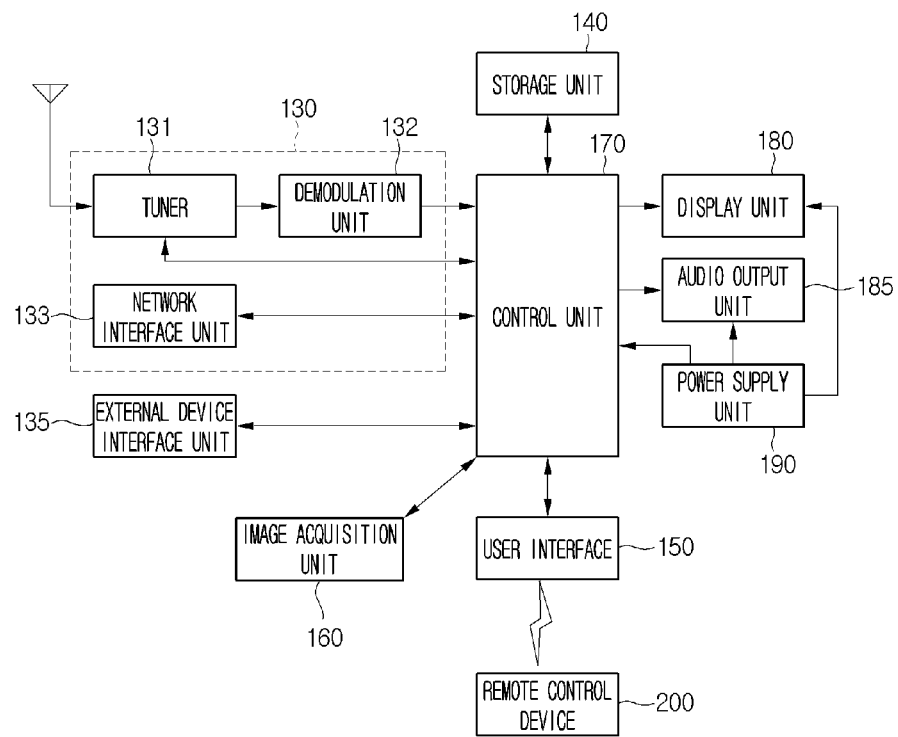

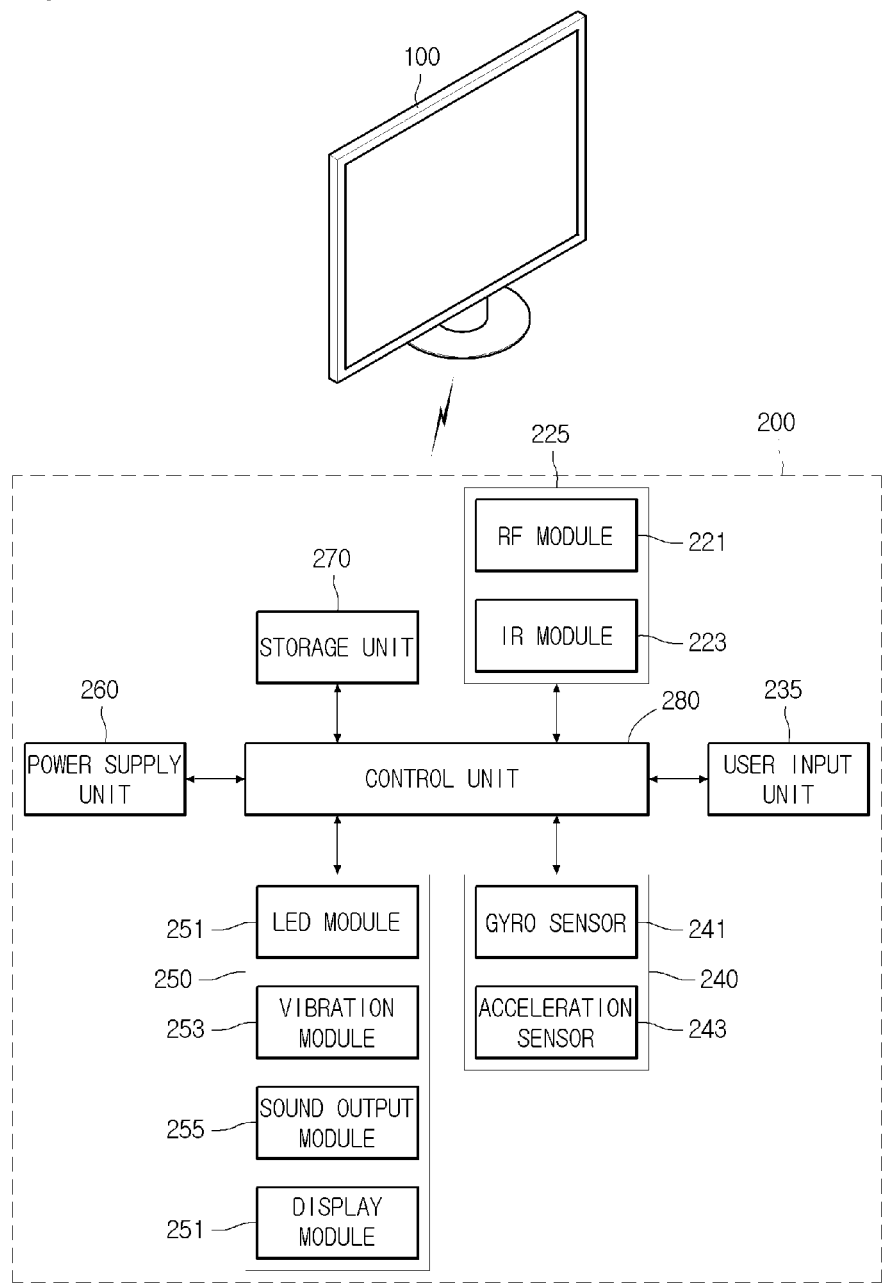

[Fig. 3]
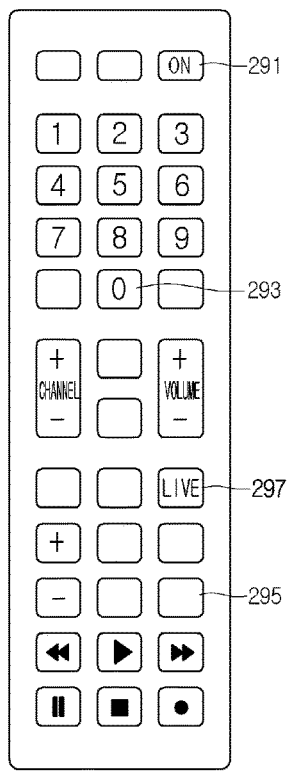
[Fig. 4]
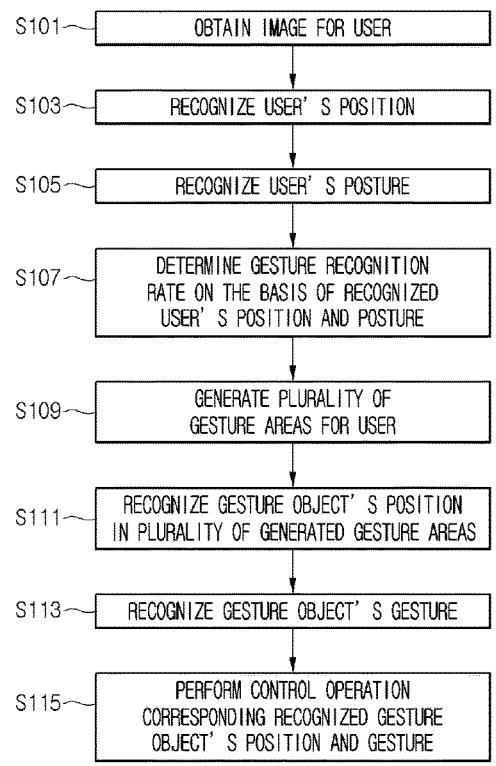

[Fig. 7]
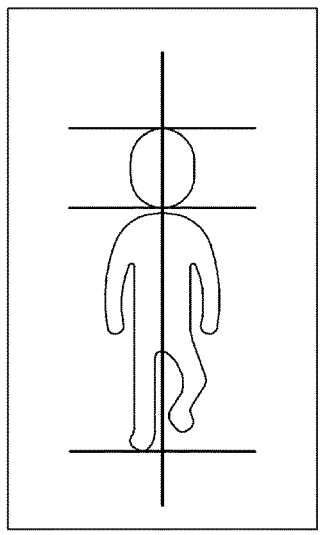
[Fig. 8]
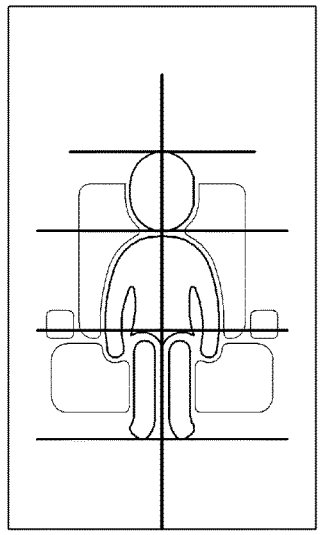
[Fig. 9]
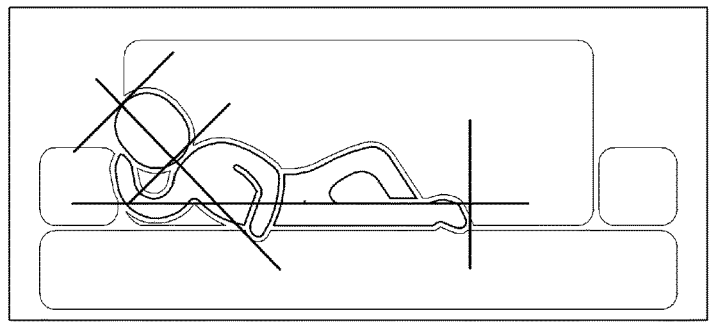

[Fig. 10]
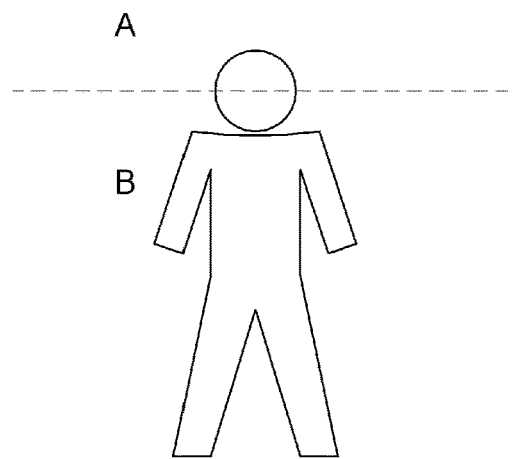
[Fig. 11]
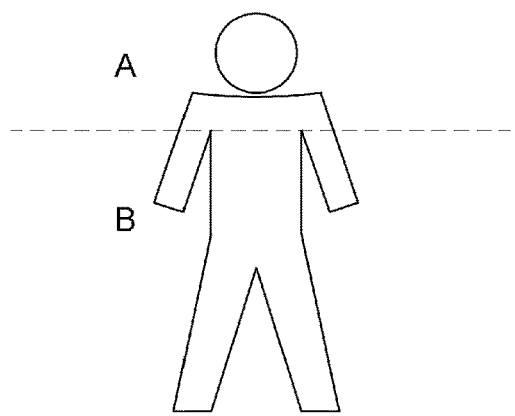
[Fig. 12]
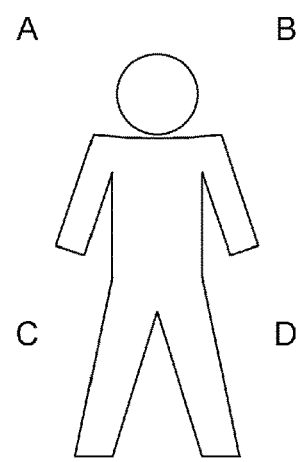

[Fig. 13]
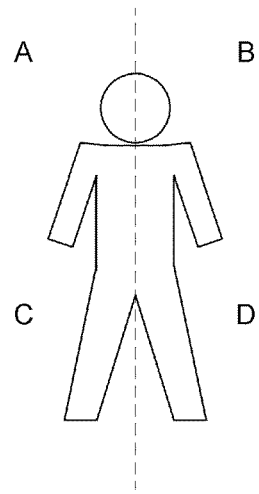
A    B
C    D
[Fig. 14]
A    B
C    D
[Fig. 15]
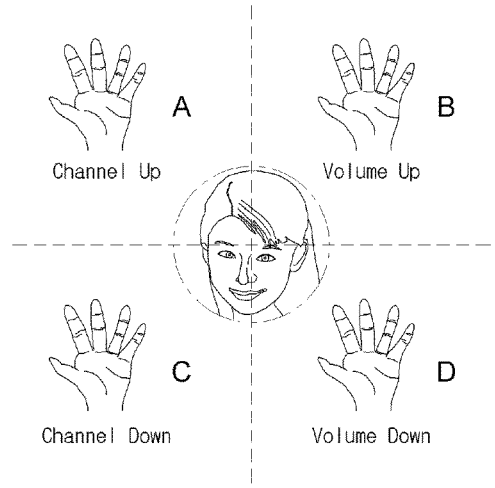
A — Channel Up
B — Volume Up
C — Channel Down
D — Volume Down

[Fig. 16]
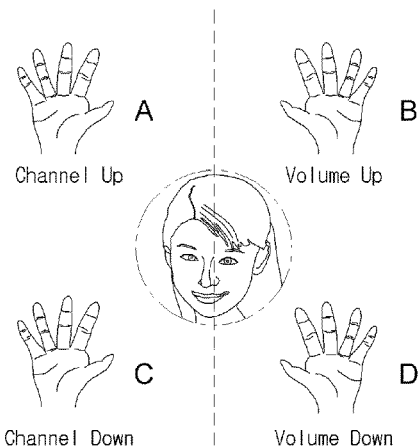
[Fig. 17]
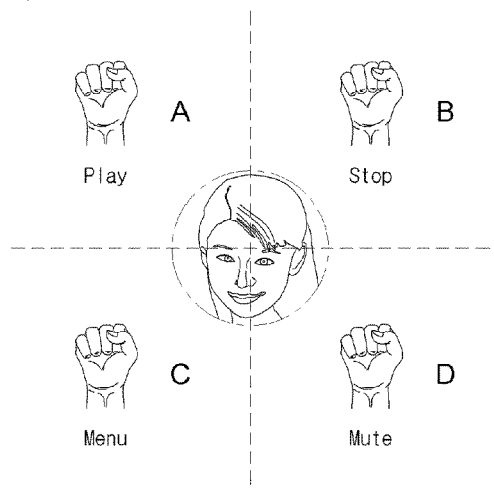
[Fig. 18]
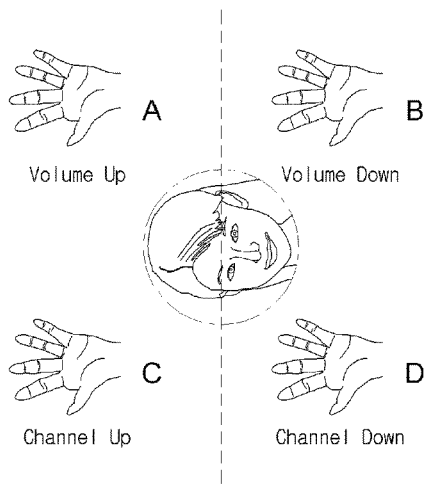

VIDEO DISPLAY DEVICE RECOGNIZING A GESTURE OF A USER TO PERFORM A CONTROL OPERATION AND OPERATING METHOD THEREOF

CROSS REFERENCE TO RELATED APPLICATIONS

This application is the National Phase of PCT International Application No. PCT/KR2014/006956, filed on Jul. 29, 2014, which claims priority under 35 U.S.C. 119(a) to Patent Application No. 10-2014-0075922, filed in Republic of Korea on Jun. 20, 2014, all of which are hereby expressly incorporated by reference into the present application.

TECHNICAL FIELD

The present disclosure relates to an video display device and an operating method thereof, and more particularly, to an video display device recognizing a user's gesture and providing a control operation corresponding to the recognized gesture and an operating method thereof.

BACKGROUND ART

Recently, a digital TV service using a wired or wireless communication network becomes generalized. The digital TV service may provide various services that cannot be provided from an existing analog broadcast service.

For example, in the case of internet protocol television service (IPTV), one type of the digital TV service, it provides an interaction that allows a user to actively select the type of viewing program and viewing time. The IPTV service may provide various enhanced services on the basis of such an interaction, for example, internet search, home shopping, and online game.

Moreover, recent smart TVs recognize user's gestures and then perform a control operation corresponding to the recognized user's gestures. However, a difference occurs in a recognition rate for recognizing a user's gesture according to a distance between a smart TV and a user and there are limitations in taking gestures depending on a user's posture. Additionally, it is inconvenient for a user to remember different gestures for each control operation to control a smart TV through a gesture.

SUMMARY OF THE INVENTION

Embodiments provide an operation for recognizing a user's gesture and a control operation corresponding to a recognized gesture and the position of a gesture object.

Embodiments also provide various control operations with one gesture operation.

Embodiments also provide a gesture recognition rate proper for a user's posture.

In one embodiment, an operating method of an video display device includes: obtaining an image for a user of the video display device; generating a plurality of gesture areas for the user from the obtained image; recognizing a position of a gesture object of the user from the plurality of generated gesture areas; recognizing a gesture of the user from the obtained image; and performing a control operation corresponding to the position of the recognized gesture object and the recognized gesture.

The generating of the plurality of gesture areas for the user may include: recognizing a position of a reference object of the user; and generating the plurality of gesture areas on the basis of the recognized reference object.

The generating of the plurality of gesture areas on the basis of the recognized reference object may include generating gesture areas vertically or horizontally on the basis of the reference object.

The performing of the control operation may include performing different control operations according to the position of the recognized gesture object even when the same gesture is recognized.

The gesture object may include an object corresponding to the user's gesture.

The performing of the control operation may include performing at least one control operation among channel switching, volume adjustment, screen enlargement, screen reduction, screen movement, pointer movement, screen setting, and sound setting of the video display device.

The method may further include recognizing a posture of the user from the obtained image.

The performing of the control operation may include performing a control operation corresponding to the position of the recognized gesture object and the recognized gesture on the basis of the recognized user's posture.

The performing of the control operation may include performing different control operations according to the recognized user's posture even when the same gesture and the position of the same gesture object are recognized.

The method may further include recognizing the user's position from the obtained image.

The method may further include determining a gesture recognition rate for the degree of recognizing the user's gesture on the basis of the recognized user's posture and user's position.

The recognizing of the user's gesture may include recognizing the user's gesture on the basis of the determined gesture recognition rate.

In another embodiment, an video display device includes: an image acquisition unit obtaining an image for a user of the video display device; and a control unit generating a plurality of gesture areas for the user from the obtained image, recognizing a position of a gesture object of the user from the plurality of generated gesture areas, recognizing a gesture of the user from the obtained image, and performing a control operation corresponding to the position of the recognized gesture object and the recognized gesture.

The control unit may recognize a position of a reference object of the user and may generate the plurality of gesture areas on the basis of the recognized reference object.

The control unit may perform different control operations according to the position of the recognized gesture object even when the same gesture is recognized.

The control unit may recognize a posture of the user from the obtained image and may perform a control operation corresponding to the position of the recognized gesture object and the recognized gesture on the basis of the recognized user's posture.

The control unit may perform different control operations according to the recognized user's posture even when the same gesture and the position of the same gesture object are recognized.

The control unit may recognize the user's position from the obtained image and may determine a gesture recognition rate for the degree of recognizing the user's gesture on the basis of the recognized user's posture and user's position.

The control unit may recognize the user's gesture on the basis of the determined gesture recognition rate.

The control unit may perform at least one control operation among channel switching, volume adjustment, screen enlargement, screen reduction, screen movement, pointer movement, screen setting, and sound setting on the basis of the position of the recognized gesture object and the recognized gesture.

The details of one or more embodiments are set forth in the accompanying drawings and the description below. Other features will be apparent from the description and drawings, and from the claims.

According to various embodiments, the present invention performs various control operation with one gesture operation, so that a user may use a gesture recognition function easily.

BRIEF DESCRIPTION OF DRAWINGS

FIG. 1 is a block diagram illustrating a configuration of an video display device according to an embodiment of the present invention.

FIG. 2 is a block diagram of a remote control device according to an embodiment of the present invention.

FIG. 3 is a block diagram illustrating an actual configuration of a remote control device according to an embodiment of the present invention.

FIG. 4 is a flowchart illustrating an operating method of an video display device according to an embodiment of the present invention.

FIGS. 7 to 9 are exemplary views illustrating a user's posture recognition according to an embodiment of the present invention.

FIGS. 10 to 13 are views illustrating a gesture area according to an embodiment of the present invention.

FIG. 14 is a view illustrating the position recognition of a gesture object according to an embodiment of the present invention.

FIGS. 15 to 18 are views illustrating a control operation corresponding to the position and gesture of a gesture object according to an embodiment of the present invention.

DETAILED DESCRIPTION OF THE EMBODIMENTS

Figure 5:
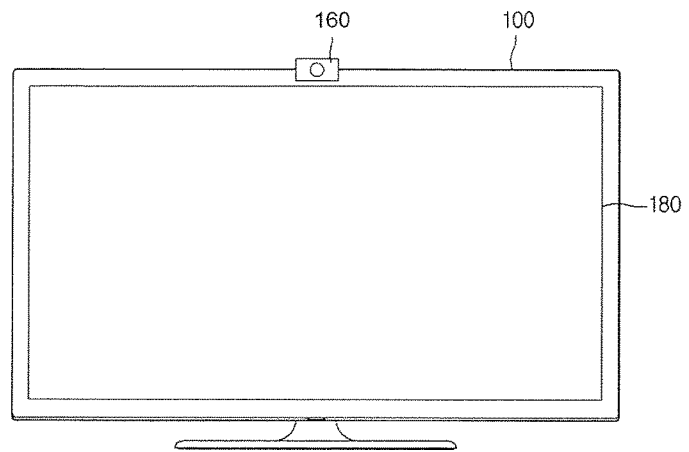
FIG. 5 is a view illustrating an image acquisition of an image acquisition unit according to an embodiment of the present invention.

Hereinafter, embodiments of the present invention will be described in more detail with reference to the accompanying drawings. The suffixes "module" and "unit" for components used in the description below are assigned or mixed in consideration of easiness in writing the specification and do not have distinctive meanings or roles by themselves.

Hereinafter, a screen display controlling method and an video display device using the same according to an embodiment of the present invention are described in detail with reference to the accompanying drawings.

An video display device according to an embodiment of the present invention, for example, as an artificial video display device adding a computer supporting function to a broadcast receiving function, may have an easy-to-use interface such as a handwriting type input device, a touch screen, or a spatial remote controller. Moreover, with the support of a wired or wireless internet function, the video display device may perform a function such as e-mail, web browsing, internet banking, or online game by accessing internet or computers. A standardized general-purpose OS may be used for such various functions.

Accordingly, since various applications are added or deleted freely on a general-purpose OS kernel, an video display device described in the present invention may perform user-friendly various functions. In more detail, the video display device, for example, may be a network TV, an HBBTV, a smart TV, an LED TV, or an OLED TV, and if necessary, may be applied to a smartphone.

FIG. 1 is a block diagram illustrating a configuration of an video display device according to an embodiment of the present invention.

Referring to FIG. 1, the video display device 100 may include a broadcast reception unit 130, an external device interface unit 135, a storage unit 140, a user input interface unit 150, an image acquisition unit 160, a control unit 170, a display unit 180, an audio output unit 185, and a power supply unit 190. Moreover, the broadcast reception unit 130 may include a tuner 131, a demodulation unit 132, and a network interface 133.

The external device interface unit 135 may receive an application or an application list in an adjacent external device and may then deliver it to the control unit 170 or the storage unit 140.

The external device interface unit 135 may include a terminal to connect to an external device, so that it may be connected to a connector of the external device.

The external device interface unit 135 may supply a power received from the power supply unit 190 to a connected external device as driving power.

Additionally, the external device interface unit 135 may deliver an operation signal that an external device transmits to the control unit 170.

On the other hand, the external device interface unit 135 may deliver a voice signal that the control unit 170 transmits to an external device.

Moreover, the external device interface unit 135 may include a sensor detecting a connection of an external device, so that it may recognize the connection.

The network interface unit 133 may provide an interface to connect the video display device 100 to a wired/wireless network including an internet network. The network interface unit 133 may transmit ore receive data to or from another user or another electronic device via an accessed network or another network linked to an accessed network.

Moreover, the network interface may transmit part of contents data stored in the video display device 100 to a selected user or a selected electronic device among pre-registered other users or other electronic devices.

The network interface unit 133 may access a predetermined webpage via an accessed network or another network linked to an accessed network. That is, the network interface unit 1300 may transmit or receive data to or from a corresponding server by accessing a predetermined webpage via a network.

Then, the network interface unit 133 may receive contents or data provided from a contents provider or a network operator. That is, the network interface unit 133 may receive contents such as movies, advertisements, games, VOD, and broadcast signals provided from a contents provider or a network provider via a network and information relating thereto.

Additionally, the network interface unit 133 may receive update information and update files of firmware provided from a network operator and may transmit data to an internet or contents provider or a network operator.

The network interface unit 133 may select and receive a desired application among applications open to the public via a network.

The storage unit 140 may store a program for each signal processing and control in the control unit 170 and may store signal processed images, voices, or data signals.

Additionally, the storage unit 140 may perform a function for temporarily storing images, voices or data signals inputted from the external device interface unit 135 or the network interface unit 133, and may store information on a predetermined image through a channel memory function.

The storage unit 140 may store an application or an application list inputted from the external device interface unit 135 or the network interface unit 133.

The video display device 100 may play a contents file (for example, a video file, a still image file, a music file, a document file, and an application file) stored in the storage unit 140 and may then provide it to a user.

The user input interface unit 150 may deliver a signal that a user inputs to the control unit 170 or may deliver a signal from the control unit 170 to a user. For example, the user input interface unit 150 may receive and process a control signal for power on/off, channel selection, and screen setting from a remote control device 200 or may transmit a control signal from the control unit 170 to the remote control device 200 according to various communication methods such as Bluetooth, Ultra Wideband (WB), ZigBee, Radio Frequency (RF) and IR communication methods.

Additionally, the user input interface unit 150 may deliver a control signal inputted from a local key (no shown) such as a power key, a channel key, a volume key, and a setting key to the control unit 170.

The image acquisition unit 160 may obtain an image.

The image acquisition unit 160 may include at least one camera and thus, may obtain an image through an included camera.

Then, the image acquisition unit 160 may deliver the obtained image to the control unit 170.

An image signal image-processed in the control unit 170 may be inputted to the display unit 180 and may then be displayed as an image corresponding to a corresponding image signal. Additionally, an image signal image-processed in the control unit 170 may be inputted to an external output device through the external device interface unit 135.

A voice signal processed in the control unit 170 may be outputted to the audio output unit 185. Additionally, a voice signal processed in the control unit 170 may be inputted to an external device through the external device interface unit 135.

Besides that, the control unit 170 may control overall operations in the video display device 100.

The control unit 170 receives a detection signal for a connection of an external device from the external device interface unit 135 and may then control the power supply unit 190 so that driving power is delivered to an external device connected to the external device interface unit 135.

Furthermore, the control unit 170 may recognize a user's position included in an image on the basis of the image obtained through the image acquisition unit 160. The control unit 170 may obtain at least one of a distance and an angle between a user and the video display device 100 on the basis of the recognized user's position.

Furthermore, the control unit 170 may recognize a user's gesture included in an image on the basis of the image obtained through the image acquisition unit 160. Then, the control unit 170 may perform a control operation corresponding to the recognized gesture.

Moreover, the control unit 170 may control the video display device 100 through a user instruction inputted through the user input interface unit 150 or an internal program, or may download an application or an application list that a user wants into the video display device 100 by accessing a network.

The control unit 170 may allow both information on a channel that a user selects and processed image or voice to be outputted through the display unit 180 or the audio output unit 185.

Moreover, the control unit 170 may allow image signals or voice signals inputted from an external device connected through the external device interface unit 135, for example, a camera or a camcorder, to be outputted through the display unit 180 or the audio output unit 185 in response to an external device image playback instruction received through the user input interface unit 150.

Moreover, the control unit 170 may perform a control on the display unit 180 to display an image and for example, may perform a control to display on the display unit 180 a broadcast image inputted through the tuner 131, an external input image inputted through the external device interface unit 135, an image inputted through the network interface unit 133, or an image stored in the storage unit 140. In this case, an image displayed on the display unit 180 may be a still image or a video, or may be a 2D image or a 3D image.

Additionally, the control unit 170 may perform a control to play contents stored in the video display device 100, received broadcast contents, or external input contents inputted from the outside, and the contents may be in various forms, for example, a broadcast image, an external input image, an audio file, a still image, an accessed web screen, and a document file.

The display unit 180 may convert an image signal processed in the control unit 170, a data signal, an OSD signal, an image signal received from the external device interface unit 135, or a data signal into R, G, and B signals so as to generate a driving signal.

Moreover, the video display device 100 shown in FIG. 1 is just one embodiment, and thus some of the components shown in FIG. 1 may be integrated, added, or omitted according to the specification of the actually implemented video display device 100.

That is, at least two components may be integrated into one component or one component may be divided into more than two components, if necessary. Additionally, a function performed in each block is used to describe an embodiment of the present invention and its specific operation or device does not limit the scope of the present invention.

According to another embodiment of the present invention, unlike those shown in FIG. 1, the video display device 100 may not include the tuner 131 and the demodulation unit 132 and may receive an image through the network interface unit 133 or the external device interface unit 1235 and may then play it.

For example, the video display device 100 may be divided into an image processing device such a settop box for receiving broadcast signals or contents according to various networks and a contents playback device playing contents inputted from the image processing device.

In this case, an image displaying method described below according to an embodiment of the present invention may be performed by one of the image processing device such as a separated settop box or the contents playback device including the display unit 180 and the audio output unit 185 in addition to the video display device 100 described with reference to FIG. 1.

Then, a remote control device according to an embodiment of the present invention will be described with reference to FIGS. 2 to 3.

FIG. 2 is a block diagram of a remote control device according to an embodiment of the present invention and FIG. 3 is a view illustrating actual configuration of a remote control device according to an embodiment of the present invention.

First, referring to FIG. 2, the remote control device 200 may include a wireless communication unit 225, a user input unit 234, a sensing unit 240, an output unit 250, a power supply unit 260, a storage unit 270, and a control unit 290.

Referring to FIG. 2, the wireless communication unit 225 may transmit/receive a signal to/from an arbitrary one among video display devices according to the above-mentioned embodiments of the present invention.

The remote control device 200 may include an RF module 221 transmitting/receiving a signal to/from the video display device 100 according to the RF communication standard and an IR module 223 transmitting/receiving a signal to/from the video display device 100 according to the IR communication standard.

Moreover, the remote control device 200 may transmit a signal containing information on a movement of the remote control device 200 to the video display device 100 through the RF module 221.

Furthermore, the remote control device 200 may receive a signal that the video display device 100 transmits through the RF module 221 and if necessary, may transmit an instruction on power on/off, channel change, and volume change to the video display device 100 through the IR module 223.

The user input unit 235 may be configured with a keypad, a button, a touch pad, or a touch screen. A user may manipulate the user input unit 235 and may input an instruction relating to the video display device 100 to the remote control device 200. When the user input unit 235 is equipped with a hard key button, a user may input an instruction relating to the video display device 100 to the remote control device 200 through a push operation of the hard key button. This will be described with reference to FIG. 3.

Referring to FIG. 3, the remote control device 200 may include a plurality of buttons. The plurality of buttons may include a power button 291, a channel button 293, a favorite channel button 295, and a LIVE button 297.

The power button 291 may be a button for turning on/off the video display device 100.

The channel button 293 may be a button for receiving a broadcast signal of a specific broadcast channel.

The favorite channel button 295 may be a button for displaying a favorite channel.

The LIVE button 297 may be a button for displaying a real-time broadcast program.

Again, FIG. 2 will be described.

When the user input unit 235 is equipped with a touch screen, a user may input an instruction relating to the video display device 100 to the remote control device 200 through a soft key touch of the touch screen. Additionally, the user input unit 235 may include various kinds of input means that a user manipulates, for example, a scroll key or a jog key, and this embodiment does not limit the scope of the present invention.

The sensing unit 240 may include a gyro sensor 241 or an acceleration sensor 243 and the gyro sensor 241 may sense information on a movement of the remote control device 200.

For example, the gyro sensor 231 may sense information on a movement of the remote control device 200 on the basis of x, y, and z axes and the acceleration sensor 243 may sense information on the movement speed of the remote control device 200. Moreover, the remote control device 200 may further include a distance measurement sensor and thus may sense a distance to the display unit 180 of the video display device 100.

The output unit 250 may output an image or voice signal corresponding to a manipulation of the user input unit 235 or corresponding to a signal that the video display device 100 transmits. A user may recognize whether the user input unit 235 is manipulated or whether the video display device 100 is controlled through the output unit 250.

For example, the output unit 250 may include an LED module 252 flashing when the user input unit 235 is manipulated or a signal is transmitted from the video display device 100 through the wireless communication module 225, a vibration module 253 generating vibration, a sound output module 255 outputting sound, or a display module 257 outputting an image.

Moreover, the power supply unit 260 supplies power to the remote control device 200 and when the remote control device 200 does not move for a predetermined time, stops power supply, so that power waste may be reduced. The power supply unit 260 may resume the power supply when a predetermined key equipped at the remote control device is manipulated.

The storage unit 270 may store several types of programs and application data necessary for a control or operation of the remote control device 200. If the remote control device 200 transmits a signal wirelessly through the video display device 100 and the RF module 221, the remote control device 200 and the video display device 100 transmit/receive signal through a predetermined frequency band.

The control unit 280 of the remote control device 200 may store information on a frequency band for transmitting/receiving a signal wirelessly to/from the video display device 100 paired with the remote control device 200 and may then refer it.

The control unit 280 may control general matters relating to a control of the remote control device 200. The control unit 280 may transmit to the video display device 100 through the wireless communication unit 225, a signal corresponding to a predetermined key manipulation of the user input unit 235 or a signal corresponding to a movement of the remote control device 200 that the sensing unit 240 senses.

Hereinafter, an operating method of the video display device 100 will be described with reference to FIG. 4.

FIG. 4 is a flowchart illustrating an operating method of the video display device 100 according to an embodiment of the present invention.

Referring to FIG. 4, the image acquisition unit 160 of the video display device 100 obtains a user's image in operation S101.

The image acquisition unit 160 may obtain a user's image through a camera included in the image acquisition unit 160.

Referring to FIG. 5, a user's image acquisition of the image acquisition unit 160 according to an embodiment of the present invention will be described.

FIG. 5 is a view illustrating an image acquisition of the image acquisition unit 160 according to an embodiment of the present invention.

Referring to FIG. 5, the image acquisition unit 160 may be disposed at the front of the video display device 100 and may obtain an image. Accordingly, the image acquisition unit 160 may obtain an image of a user using the video display device 100.

According to an embodiment of the present invention, the image acquisition unit 160 may obtain a user's image through a camera equipped at the front of the video display device 100. Then, the image acquisition unit 160 may deliver the obtained user's image to the control unit 170. Herein, the obtained user's image may include an image for a user's gesture operation.

Additionally, the camera may not be included in the display device 100 but may exist as an additional component.

The video display device 100 recognizes the user's position on the basis of the obtained user's image in operation S103.

The control unit 170 of the video display device 100 may recognize the user's position on the basis of the user's image obtained by the image acquisition unit 160. Herein, the user's position may include at least one of a distance and an angle between a user and the video display device 100.

This will be described with reference to FIG. 6.

Figure 6:
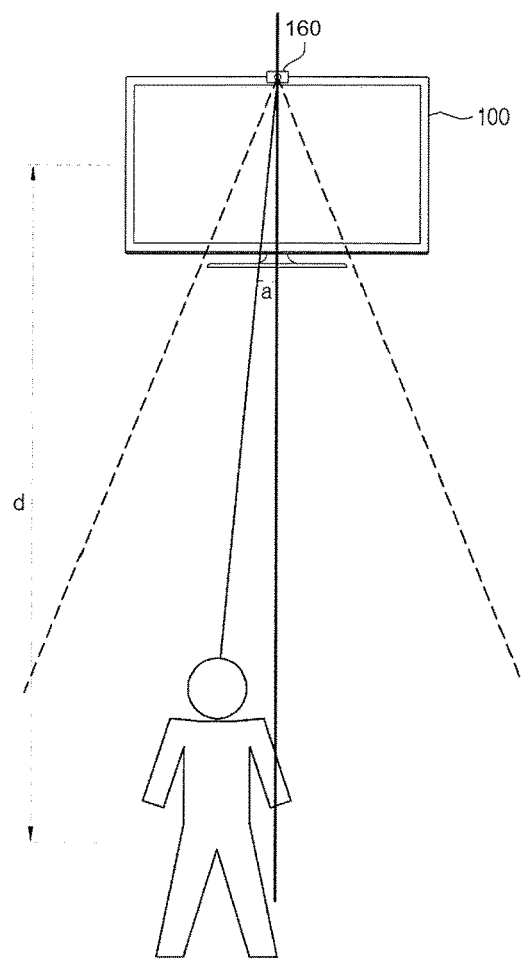
FIG. 6 is a view illustrating a user's position recognition according to an embodiment of the present invention.

FIG. 6 is a view illustrating a user's position recognition according to an embodiment of the present invention.

Referring to FIG. 6, the control unit 170 may calculate a distance d between a user and the video display device 100 and an angle a between a user and the video display device 100 on the basis of the obtained user's image.

A technique for calculating a distance and an angle between subjects on the basis of an obtained image is a well known technique and thus its detailed description is omitted.

The video display device 100 recognizes a user's posture on the basis of the obtained user's image in operation 105.

The control unit 170 of the video display device 100 may recognize a user's posture on the basis of the user's image obtained by the image acquisition unit 160.

According to an embodiment of the present invention, the video display device 100 may recognize the user's body frame on the basis of the obtained user's image. In more detail, the control unit 170 may recognize a user's posture on the basis of the recognized user's body frame. The control unit 170 may recognize at least one of a user's body ratio and a relative position on the basis of the recognized user's body frame. Then, the control unit 170 may recognize a user's posture on the basis of at least one of a recognized user's body ratio and relative position.

This will be described with reference to FIGS. 7 to 9.

FIGS. 7 to 9 are exemplary views illustrating a user's posture recognition according to an embodiment of the present invention.

Referring to FIG. 7, the control unit 170 may recognize a user' standing posture on the basis of a user's body frame, a user's body ratio, and a relative position, which are recognized from an obtained user's image. According to an embodiment of the present invention, when the user's head and the user's leg parts are disposed vertically, a ratio that the user's head, body, and leg parts occupy is more than a predetermined value, and a connection line connecting the user's head, body, and leg parts is close to a straight line, the control unit recognizes them as a user's standing posture.

Referring to FIG. 8, the control unit 170 may recognize a user' sitting posture on the basis of a user's body frame, a user's body ratio, and a relative position, which are recognized from an obtained user's image. According to an embodiment of the present invention, when the user's head and the user's leg parts are disposed vertically, a ratio that the user's head, body, and leg parts occupy is less than a predetermined value, and a connection line connecting the user's head, body, and leg parts is close to a straight line, the control unit recognizes them as a user's sitting posture.

Referring to FIG. 9, the control unit 170 may recognize a user' lying on side posture on the basis of a user's body frame, a user's body ratio, and a relative position, which are recognized from an obtained user's image. According to an embodiment of the present invention, when the user's head and the user's leg parts are disposed horizontally, a ratio that the user's head, body, and leg parts occupy is more than a predetermined value, and a connection line connecting the user's head, body, and leg parts is not a straight line, the control unit recognizes them as a user's lying on side posture.

The above is an example for describing a user's posture recognition of the video display device 100 but beside that, a user's posture may be recognized through various methods.

The video display device 100 determines a gesture recognition rate on the basis of the recognized user's position and posture in operation S107.

The control unit 170 may determine a gesture recognition rate for the degree of recognizing a user's gesture operation on the basis of the recognized user's position and posture.

Herein, the gesture recognition rate may include at least one of a sensitivity representing a holding time for which a user maintains a gesture operation and a similarity representing a matching degree between a user's gesture operation and a predetermined gesture operation.

According to an embodiment of the present invention, when the recognized user's position is within a predetermined distance to the video display device 100 and the recognized user's posture is a standing posture, the control unit 170 may lower a gesture recognition rate. Accordingly, the video display device 100 may recognize a user's gesture operation having an accuracy of more than a predetermined level.

According to another embodiment of the present invention, when the recognized user's position is within a predetermined distance to the video display device 100 and the recognized user's posture is a lying posture, the control unit 170 may raise a gesture recognition rate. Accordingly, the video display device 100 may recognize a user's gesture operation having an accuracy of less than a predetermined level.

The description for determining the gesture recognition rate is just an example, and thus the gesture recognition rate may be set diversely according to a user's or designer's selection.

The video display device 100 generates a plurality of gesture areas for a user in operation S109.

The control unit 170 of the video display device 100 may generate a plurality of gesture areas for a user on the basis of the obtained user's image. Herein, a gesture area may mean an area where a user's gesture operation is performed.

According to an embodiment of the present invention, the control unit 170 may generate a plurality of gesture areas for a user on the basis of a reference object. Herein, the reference object may be an object that serves as a reference for creating a gesture area. Additionally, the reference object may include part of a user's body, for example, a hand, a finger, a foot, a head, and a face.

This will be described with reference to FIGS. 10 and 13.

FIGS. 10 to 13 are views illustrating a gesture area according to an embodiment of the present invention.

Referring to FIG. 10, the control unit 170 may create an area A and an area B as a gesture area. The area A is above the head and the area B is below the head on the basis of the head, that is, a reference object.

Additionally, the control unit 170 may create a gesture area for user on the basis of a position spaced a predetermined distance from the reference object.

Referring to FIG. 11, the control unit 170 may create an area A and an area B as a gesture area. The area A is above a reference line that is spaced a predetermined distance from the head and the area B is below the reference line.

Moreover, the control unit 170 may generate a plurality of gesture areas with respect to a horizontal direction in addition to a vertical direction.

Referring to FIG. 12, the control unit 170 may create four areas (i.e., upper, lower, left and right areas) on the basis of a head, that is, a reference object. Accordingly, the control unit 170 may create an area A, an area B, an area C, and an area D as gesture areas on the basis of the user's head.

Additionally, the control unit 170 may create four areas (i.e., upper, lower, left and right areas) on the basis of a position that is spaced a predetermined distance from the reference object.

Referring to FIG. 13, the control unit 170 may create an area A, an area B, an area C, and an area D as gesture areas on the basis of a position that is spaced a predetermined distance from the head, that is, the reference object.

The above gesture area is just an example, and thus the gesture area may be set diversely according to a user's or designer's selection.

The video display device 100 recognizes the position of a gesture object from a plurality of created gesture areas in operation S111.

The control unit 170 may recognize the position of a gesture object from a plurality of gesture areas by recognizing a user's gesture object. Accordingly, the control unit 170 may recognize a gesture area where a gesture object is positioned.

Herein, the gesture object may be an object that performs a gesture operation. Additionally, the reference object may include part of a user's body, for example, a hand, a finger, a foot, a head, and a face.

This is described with reference to FIG. 14.

FIG. 14 is a view illustrating the position recognition of a gesture object according to an embodiment of the present invention.

Referring to FIG. 14, the control unit 170 may recognize a user's hand, that is, a gesture object, from an area A, an area B, an area C, and an area D, that is, a plurality of created gesture areas. Accordingly, the control unit 170 may recognize that the position of a user's hand, that is, a gesture object, is in the gesture area B.

The video display device 100 recognizes a gesture of a gesture object in operation S113.

The control unit 170 may recognize a user's gesture on the basis of an obtained user's image. In more detail, the control unit 170 may recognize one of the form or movement of a gesture object.

Additionally, the control unit 170 may recognize a gesture on the basis of a determined gesture recognition rate.

The control unit 170 may recognize a user's gesture on the basis of the recognition rate determined in operation S107.

According to an embodiment of the present invention, when the gesture recognition rate is more than a reference value, the control unit 170 may recognize a user's gesture having an accuracy of less than a predetermined level.

According to another embodiment of the present invention, when the gesture recognition rate is less than a reference value, the control unit 170 may not recognize a user's gesture having an accuracy of less than a predetermined level.

The video display device 100 performs a control operation corresponding to the recognized gesture object's position and gesture in operation S115.

The control unit 170 may perform a control operation corresponding to the gesture object's position recognized in operation S111 and the gesture object's gesture recognized in operation S113.

In more detail, the control unit 170 may perform a control operation corresponding to a gesture area where a gesture object is positioned among a plurality of gesture areas and a gesture object's gesture.

Then, a control operation performed by the video display device 100 may include various control operations. For example, the video display device 100 may perform at least one control operation among channel switching, volume adjustment, screen enlargement, screen reduction, screen movement, pointer movement, screen setting, and sound setting.

This will be described with reference to FIGS. 15 and 18.

FIGS. 15 to 18 are views illustrating a control operation corresponding to the position and gesture of a gesture object according to an embodiment of the present invention.

Referring to FIG. 15, when the position of a hand, that is, a user's gesture object, is in a gesture area A and a user's gesture is recognized as an opening hand gesture, the control unit 170 may perform a channel-up operation as a corresponding control operation. When the position of a hand, that is, a user's gesture object, is in a gesture area B and a user's gesture is recognized as an opening hand gesture, the control unit 170 may perform a volume-up operation as a corresponding control operation. When the position of a hand, that is, a user's gesture object, is in a gesture area C and a user's gesture is recognized as an opening hand gesture, the control unit 170 may perform a channel-down operation as a corresponding control operation. When the position of a hand, that is, a user's gesture object, is in a gesture area D and a user's gesture is recognized as an opening hand gesture, the control unit 170 may perform a volume-down operation as a corresponding control operation.

Moreover, even when a user's gesture object is the left hand or the right hand, the video display device 100 may perform the same control operation.

Referring to FIG. 16, when the position of a right hand, that is, a user's gesture object, is in a gesture area A and a user's gesture is recognized as an opening hand gesture, the control unit 170 may perform a channel-up operation as a corresponding control operation. When the position of a left hand, that is, a user's gesture object, is in a gesture area B and a user's gesture is recognized as an opening hand gesture, the control unit 170 may perform a volume-up operation as a corresponding control operation. When the position of a right hand, that is, a user's gesture object, is in a gesture area C and a user's gesture is recognized as an opening hand gesture, the control unit 170 may perform a channel-down operation as a corresponding control operation. When the position of a left hand, that is, a user's gesture object, is in a gesture area D and a user's gesture is recognized as an opening hand gesture, the control unit 170 may perform a volume-down operation as a corresponding control operation.

Another embodiment will be described with reference to FIG. 17.

Referring to FIG. 17, when the position of a hand, that is, a user's gesture object, is in a gesture area A and a user's gesture is recognized as a closing hand gesture, the control unit 170 may perform a playback operation as a corresponding control operation. When the position of a hand, that is, a user's gesture object, is in a gesture area B and a user's gesture is recognized as a closing hand gesture, the control unit 170 may perform a stop operation as a corresponding control operation. When the position of a hand, that is, a user's gesture object, is in a gesture area C and a user's gesture is recognized as a closing hand gesture, the control unit 170 may perform a menu displaying operation as a corresponding control operation. When the position of a hand, that is, a user's gesture object, is in a gesture area D and a user's gesture is recognized as a closing hand gesture, the control unit 170 may perform a mute operation as a corresponding control operation.

Moreover, the video display device 100 may perform a control operation corresponding to the gesture object's position and gesture recognized on the basis of a user's posture.

This will be described with reference to FIG. 18.

Referring to FIG. 18, when a user lies on his/her side, the position of a hand, that is, a user's gesture object, is in a gesture area A, and a user's gesture is recognized as an opening hand gesture, the control unit 170 may perform a volume-up operation as a corresponding control operation. When a user lies on his/her side, the position of a hand, that is, a user's gesture object, is in a gesture area B, and a user's gesture is recognized as an opening hand gesture, the control unit 170 may perform a volume-down operation as a corresponding control operation. When a user lies on his/her side, the position of a hand, that is, a user's gesture object, is in a gesture area C, and a user's gesture is recognized as an opening hand gesture, the control unit 170 may perform a channel-up operation as a corresponding control operation. When a user lies on his/her side, the position of a hand, that is, a user's gesture object, is in a gesture area D, and a user's gesture is recognized as an opening hand gesture, the control unit 170 may perform a channel-down operation as a corresponding control operation.

The above-mentioned control operation of the video display device 100 according to a user's gesture is an example for the description and thus may be set diversely according to a user's or designer's selection. Accordingly, the video display device 100 may perform various control operations according to a gesture's form or movement and the position of a gesture object. For example, the video display device 100 may perform at least one control operation among channel switching, volume adjustment, screen enlargement, screen reduction, screen movement, pointer movement, screen setting, and sound setting.

Moreover, the video display device 100 may set a control operation corresponding to a user's gesture according to a user's or designer's selection. Accordingly, a control operation of the video display device 100 corresponding to the same gesture may be set differently for each of a plurality of users.

According to an embodiment of the present invention, the above method may be implemented on a program recorded medium as processor readable code. Examples of the processor readable medium may include ROM, RAM, CD-ROM, magnetic tape, floppy disk, and optical data storage devices and also may be implemented in a form of a carrier wave (for example, transmission through internet).

In relation to the above-described video display device, the configurations and methods of the above-described embodiments are applied without limitations and in order to provide various modifications, some or all of embodiments may be selectively combined and configured.

Moreover, the present invention may improve a recognition rate for recognizing a gesture that a user takes.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An operating method of a video display device, the method comprising:
   obtaining an image of a user of the video display device;
   generating a plurality of gesture areas for the user from the obtained image;
   recognizing a position of a gesture object of the user from the plurality of generated gesture areas;
   recognizing a gesture of the user from the obtained image;
   recognizing a posture of the user from the obtained image;
   performing a control operation corresponding to the recognized position of the gesture object and the recognized gesture based on the recognized posture of the user,
   wherein the performing of the control operation comprises performing different control operations according to the recognized posture of the user even when the recognized gesture and the recognized position of the gesture object are identical,
   wherein the recognized posture of the user includes at least one of a user's standing posture, a user's sitting posture and a user's lying posture, and
   wherein the performing different control operations according to the recognized posture of the user comprises:
   performing a first control operation when the recognized posture of the user is a user's standing posture and the recognized gesture is a first recognized gesture and the recognized position of the gesture object is a first recognized position, and
   performing a second control operation when the recognized posture of the user is a user's lying posture and the recognized gesture is the first recognized gesture and the recognized position of the gesture object is the first recognized position, the second control operation being different than the first control operation.

2. The method according to claim 1, wherein the generating of the plurality of gesture areas for the user comprises:
   recognizing a position of a reference object of the user; and
   generating the plurality of gesture areas based on the recognized reference object.

3. The method according to claim 2, wherein the generating of the plurality of gesture areas based on the recognized reference object comprises generating gesture areas vertically or horizontally based on the reference object.

4. The method according to claim 2, wherein the performing of the control operation comprises performing different control operations according to the recognized position of the gesture object even when the recognized gesture is identical.

5. The method according to claim 1, wherein the gesture object comprises an object corresponding to the user's gesture.

6. The method according to claim 1, wherein the performing of the control operation comprises performing at least one control operation among channel switching, volume adjustment, screen enlargement, screen reduction, screen movement, pointer movement, screen setting, and sound setting of the video display device.

7. The method according to claim 1, further comprising recognizing a user's position from the obtained image.

8. The method according to claim 7, further comprising determining a gesture recognition rate indicating a degree of recognizing the user's gesture based on the recognized user's posture and the recognized user's position.

9. The method according to claim 8, wherein the recognizing of the user's gesture comprises recognizing the user's gesture based on the determined gesture recognition rate.

10. A video display device comprising:
an image acquisition unit obtaining an image of a user of the video display device; and
a control unit generating a plurality of gesture areas for the user from the obtained image, recognizing a position of a gesture object of the user from the plurality of generated gesture areas, recognizing a gesture of the user from the obtained image, recognizing a posture of the user from the obtained image, and performing a control operation corresponding to the recognized position of the gesture object and the recognized gesture based on the recognized posture of the user,
wherein the control unit is further configured to perform different control operations according to the recognized posture of the user even when the recognized gesture and the recognized position of the gesture object are identical,
wherein the recognized posture of the user includes at least one of a user's standing posture, a user's sitting posture and a user's lying posture, and
wherein the performing different control operations according to the recognized posture of the user comprises:
performing a first control operation when the recognized posture of the user is a user's standing posture and the recognized gesture is a first recognized gesture and the recognized position of the gesture object is a first recognized position, and
performing a second control operation when the recognized posture of the user is a user's lying posture and the recognized gesture is the first recognized gesture and the recognized position of the gesture object is the first recognized position, the second control operation being different than the first control operation.

11. The device according to claim 10, wherein the control unit recognizes a position of a reference object of the user and generates the plurality of gesture areas based on the recognized reference object.

12. The device according to claim 11, wherein the control unit performs different control operations according to the position of the recognized gesture object even when the recognized gesture of the user is identical.

13. The device according to claim 10, wherein the control unit recognizes a user's position from the obtained image and determines a gesture recognition rate indicating a degree of recognizing the user's gesture based on the recognized posture of the user and the recognized user's position.

14. The device according to claim 13, wherein the control unit recognizes the user's gesture based on the determined gesture recognition rate.

15. The device according to claim 10, wherein the control unit performs at least one control operation among channel switching, volume adjustment, screen enlargement, screen reduction, screen movement, pointer movement, screen setting, and sound setting based on the position of the recognized gesture object and the recognized gesture.

* * * * *